(12) United States Patent
Arnett et al.

(10) Patent No.: US 11,877,698 B2
(45) Date of Patent: *Jan. 23, 2024

(54) SOUND REDUCING AIRFLOW SYSTEM FOR A BLENDER SYSTEM

(71) Applicant: VITA-MIX MANAGEMENT CORPORATION, Olmsted Township, OH (US)

(72) Inventors: Michael Arnett, Columbia Station, OH (US); Eugene J. Kozlowski, Medina, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,740

(22) Filed: Jan. 10, 2022

(65) Prior Publication Data
US 2022/0378248 A1 Dec. 1, 2022

Related U.S. Application Data

(63) Continuation of application No. 16/325,428, filed as application No. PCT/US2017/046487 on Aug. 11, 2017, now Pat. No. 11,219,334.
(Continued)

(51) Int. Cl.
*A47J 43/08* (2006.01)
*A47J 43/046* (2006.01)
(Continued)

(52) U.S. Cl.
CPC ............ *A47J 43/07* (2013.01); *A47J 43/046* (2013.01); *A47J 43/085* (2013.01); *H02K 5/207* (2021.01); *H02K 5/24* (2013.01); *H02K 9/06* (2013.01)

(58) Field of Classification Search
CPC ........ A47J 43/07; A47J 43/046; A47J 43/085; H02K 5/207; H02K 5/24; H02K 9/06
(Continued)

(56) References Cited

U.S. PATENT DOCUMENTS

| 3,901,484 A | 8/1975 | Ernster |
| 4,277,181 A | 7/1981 | Stahly et al. |

(Continued)

FOREIGN PATENT DOCUMENTS

| KR | 20130000329 | 1/2013 |
| WO | 2009049355 | 4/2009 |
| WO | 2016196271 | 12/2016 |

OTHER PUBLICATIONS

Patent Cooperation Treaty (PCT), International Search Report and Written Opinion for Application PCT/US2017/046487 filed Aug. 11, 2017, dated Nov. 2, 2017, International Searching Authority, US.

*Primary Examiner* — Alex W Mok
(74) *Attorney, Agent, or Firm* — Dinsmore & Shohl LLP

(57) ABSTRACT

A blender system is shown and described herein. In one aspect, the blender system includes a base with an interior and an exterior formed by a housing. The housing may include an air inlet port and an exhaust port. The interior of the base includes a motor bore forming an air pathway connecting the air inlet port to the exhaust port. The motor bore also includes an entry aperture fluidly connecting the motor bore to the air inlet port. The entry aperture is indirectly in line with the air inlet port. The exit aperture fluidly connects the motor bore to the exhaust port, and the exit aperture is indirectly in line with the exhaust port.

20 Claims, 7 Drawing Sheets

Related U.S. Application Data

(60) Provisional application No. 62/376,444, filed on Aug. 18, 2016.

(51) Int. Cl.
*H02K 5/20* (2006.01)
*H02K 5/24* (2006.01)
*H02K 9/06* (2006.01)
*A47J 43/07* (2006.01)

(58) Field of Classification Search
USPC .......................................................... 310/51
See application file for complete search history.

(56) References Cited

U.S. PATENT DOCUMENTS

| | | |
|---|---|---|
| 4,776,058 A | 10/1988 | Garner et al. |
| 5,273,358 A | 12/1993 | Bryne et al. |
| 6,595,113 B1 | 7/2003 | Chang et al. |
| 7,320,542 B2 | 1/2008 | Tai |
| 7,942,570 B2 | 5/2011 | Steiner et al. |
| 11,219,334 B2 * | 1/2022 | Arnett ..................... A47J 43/07 |
| 2003/0228213 A1 | 12/2003 | Bikos et al. |
| 2006/0007778 A1 | 1/2006 | Tai |
| 2008/0098905 A1 | 5/2008 | Steiner et al. |
| 2009/0095459 A1 | 4/2009 | Williams et al. |
| 2010/0248605 A1 | 9/2010 | Sharma et al. |
| 2012/0294109 A1 | 11/2012 | Boozer |
| 2015/0351589 A1 | 12/2015 | Boozer |
| 2016/0348697 A1 | 12/2016 | Gilliland et al. |

* cited by examiner

SOUND REDUCING AIRFLOW SYSTEM FOR A BLENDER SYSTEM

CROSS-REFERENCE TO RELATED APPLICATIONS

This application is a continuation of U.S. Utility application Ser. No. 16/325,428 filed on Feb. 14, 2019 and entitled ""SOUND REDUCING AIRFLOW SYSTEM FOR A BLENDER SYSTEM, "which is a 35 U.S.C. 371 national stage filing of PCT Application No. PCT/US2017/046487 filed Aug. 11, 2017, and entitled "SOUND REDUCING AIRFLOW SYSTEM FOR A BLENDER SYSTEM," which claims priority to U.S. Provisional Patent Application No. 62/376,444 entitled "SOUND REDUCING AIRFLOW SYSTEM FOR A BLENDER SYSTEM," filed on Aug. 18, 2016, each of which are incorporated herein by reference in their entireties.

BACKGROUND

Loud noise in both household and commercial blenders has been an issue. Blenders may be designed for home use or for commercial use, and typically perform a mixing function for a drink or other food. When utilized in businesses, such as restaurants or coffee shops, the blender is often positioned adjacent to a serving or dining area so that the food or drinks may be prepared as ordered. When so placed, the sound emitted by the blender can disturb or distract customers as it processes or mixes a drink.

The motor is a direct source of noise when in operation, and also is an indirect source of noise due to the vibration it creates within the base. The vibrations created by the operating motor cause the base itself, and other components within the base, to vibrate, thereby generating additional noise.

Furthermore, the cooling air flowing through the blender base can amplify the loud motor sound. Cooling air is typically provided to the motor within the base to prevent overheating. This cooling air may be drawn in through an air inlet and forced out of the base through an air exhaust. The air moving within the blender and out of the blender contributes to the noise heard during operation of the blender.

Therefore, the need exists for addressing the root issue: reducing blender base noise within the base itself without adding additional components to the blender system. There is also a need for an improved blender system that may decrease user perceived noise.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in detail in other portions of this disclosure.

The present disclosure provides for a blender base comprising a housing comprising an air inlet aperture, a motor disposed within the housing, a diffuser disposed in the housing and comprising a diffuser aperture operatively in fluid communication with the air inlet aperture, and a fan operatively forcing air to travel through the air inlet aperture, about the diffuser, and through the diffuser aperture. It is noted that the aperture of the diffuser may be out of or otherwise not within a line of sight of the air inlet aperture. In another aspect, the diffuser may comprise a curved wall. The diffuser may comprise a wall comprising at least one corner. The housing may comprise an exhaust aperture. Further, the exhaust aperture may be out of or otherwise not within a line of sight of the fan. The exhaust port may comprise a grill. The housing may comprise air inlet port further comprises a grill. The blender base may comprise a fan chamber disposed in the housing, wherein the fan is disposed within the fan chamber. The motor may operatively drive the fan.

The present disclosure further provides a blender base comprising a housing having an interior, an exterior, an air inlet port, and an exhaust port, a motor disposed within the housing and comprising a motor bore, a motor baffle member disposed about at least a portion of the motor, and a fan disposed in an air passageway between the air inlet port and the motor. It is noted that the motor baffle member operatively directs all air through only the motor bore and out of the exhaust port. Moreover, the air inlet port may comprise a first grill. In another aspect, the housing may comprise a second grill disposed within the housing. The housing may further comprise an upper chamber and a motor chamber, wherein the upper chamber is disposed between the housing and the motor chamber. It is noted that the fan may operatively circulate air in the upper chamber. The housing may further comprise a user interface disposed on a first side of the housing and an air inlet disposed on a second side of the housing, wherein the second side is generally opposed to the first side. Moreover, the motor baffle member may comprise a body having an aperture, the aperture operatively in a closely fitting engagement with at least a portion of the motor.

According to another aspect, a blender system may comprise a blender base comprising a housing, the housing includes an air inlet port and an exhaust port, a motor disposed within the housing and comprising a motor bore, an air passageway formed between the air inlet port and the exhaust port, a motor baffle member operatively restricting the air passageway from circumventing the motor bore; and a fan disposed the in the air passageway between the air inlet port and the motor. The fan may operatively push air through the motor bore, and the fan me be out of a line of sight of the air inlet port and the exhaust port. Further, the blender system may comprise a diffuser comprising an aperture and disposed in the housing, wherein the aperture is disposed generally opposed to the air inlet port. In another aspect, the blender system may comprise a fan chamber housing the fan, and the fan chamber may comprise a fan inlet operatively receiving air flow from the air inlet, wherein the fan inlet is out of the line of site of the air inlet port.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and related methods, in which like reference characters refer to like parts throughout, and in which.

DETAILED DESCRIPTION

Figure 1:
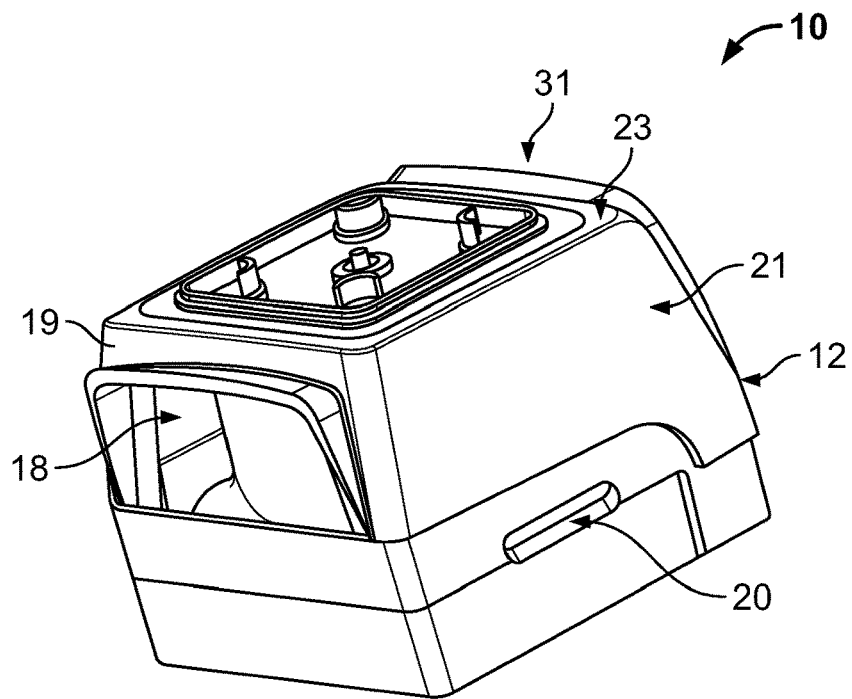
FIG. 1 is a perspective view of a blender base including a sound reducing airflow system.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). Accordingly, embodiments or examples describing actions by a user do not necessarily require human actions.

Aspects of systems, apparatuses or processes described herein generally relate to blender assemblies, systems, or devices and related methods. In an embodiment, the blender assembly may include a blender container. The blender container may comprise a pitcher, bowl, cup, or other general shape. A blade assembly may be attached to a bottom or closed end of the blender container. In other examples, the blade assembly may be attached to an open end of a blender container, such as in a single serving container.

The various embodiments described herein may include other components and/or functionality. It is noted that while various embodiments refer to a blender or a blender system, various other systems may be utilized in view of embodiments described herein. For example, embodiments may be utilized in food processor systems, mixing systems, handheld blender systems, coffee grinders, spice grinders, various other food preparation systems, non-food mixing systems, and the likes. As such, references to a blender, blender system, and the like, are understood to include food processor systems, non-food mixing systems, or other mixing systems. Such systems generally include a blender base that may include a motor, a controller, display, a memory and a processor, which may execute instructions stored in the memory. Further, such systems may include a blender container and a blade assembly. The blade assembly, the blender container, and the blender base may removably or irremovably attach. Foodstuff may be added to the blender container for blending of the foodstuff. Furthermore, while blending of "ingredients," "food," "contents," or "foodstuffs" is described by various embodiments, it is noted that non-food stuff may be mixed or blended, such as paints, epoxies, construction material (e.g., mortar, cement, etc.), and the likes.

Moreover, blending of foodstuff or ingredients may result in a blended product. Such blended products may include drinks (cold or hot), smoothies, shakes, soups, purees, or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

While embodiments may describe a blender base having a rear side, a front side, a bottom side, or the like, it is noted that such descriptions are utilized for simplicity of explanation. For instance, while an air inlet is described as being disposed on a rear side, the air inlet may be disposed on a front, top, bottom, or the like. Such descriptive terms may be used to describe orientations depicted in the drawings. As such, the relative terms (e.g., front, back, etc.) are not limiting. For instance, the blender base may comprise a cylindrical shape that may not have a traditional front or rear. Accordingly, references to a front or rear may be replaced with a first side or a second side, and the like. However, at least for the sake of brevity, these terms may be utilized in describing the drawings.

In some traditional blender systems, a blender base may include a motor that is connected to a power source. A blade assembly and a container may be removably or irremovably attached to the blender base. The motor may then drive or otherwise cause a blade (or other mixing portion) to mix foodstuff (e.g., rotate, chop, blend, etc.). Some systems may have speed settings that a user may select for a blending process. Such systems may include a fan that draws air into the system. These systems, however, are often noisy.

In some other traditional blender systems, air is pulled through an aperture, by a fan, in the line of sight of an air intake. This may allow noise and vibrations to escape a body or housing. These systems, likewise, may include air intakes that are disposed on a bottom or side of housing. This may further allow noise to be passed through openings to an ambient environment. In another aspect, some systems may use dedicated passages or ports that allow air to go around portions of a motor. This may be less efficient than embodiments describe herein.

FIGS. 1-9 illustrate a blender base 10 comprising a motor housing 40. The blender base 10 is generally configured to support a blender container (not shown) and facilitate rotation of a blending blade disposed within the blender container. The container receives foodstuff for blending and a blender motor 42 operatively drives a blade within the container to blend the foodstuff.

The blender base 10 may include a housing 12. The housing 12 may be any appropriate shape, size or configuration, such as generally rectangular, including square-shaped, or cylindrical. The housing 12 may be made of any appropriate material, such as molded plastic or the like. The housing 12 may include features designed to facilitate airflow through the blender base 10. For example, the housing 12 may include hollow portions, ridged portions and openings, as described herein, to create pathways to direct the flow of air through the blender base 10. Airflow may, for example, provide ambient air to operative components of the blender base 10 and may remove heated air from the operative components. This may allow the blender base 10 to cool or otherwise regulate the temperature The housing 12 may comprise one or more chambers or cavities that house various operative components. For instance, the housing 12 may comprise a lower chamber 27, a motor chamber 40, and an upper chamber 29. It is noted that the housing 12 may comprise other or different chambers.

Figure 2:
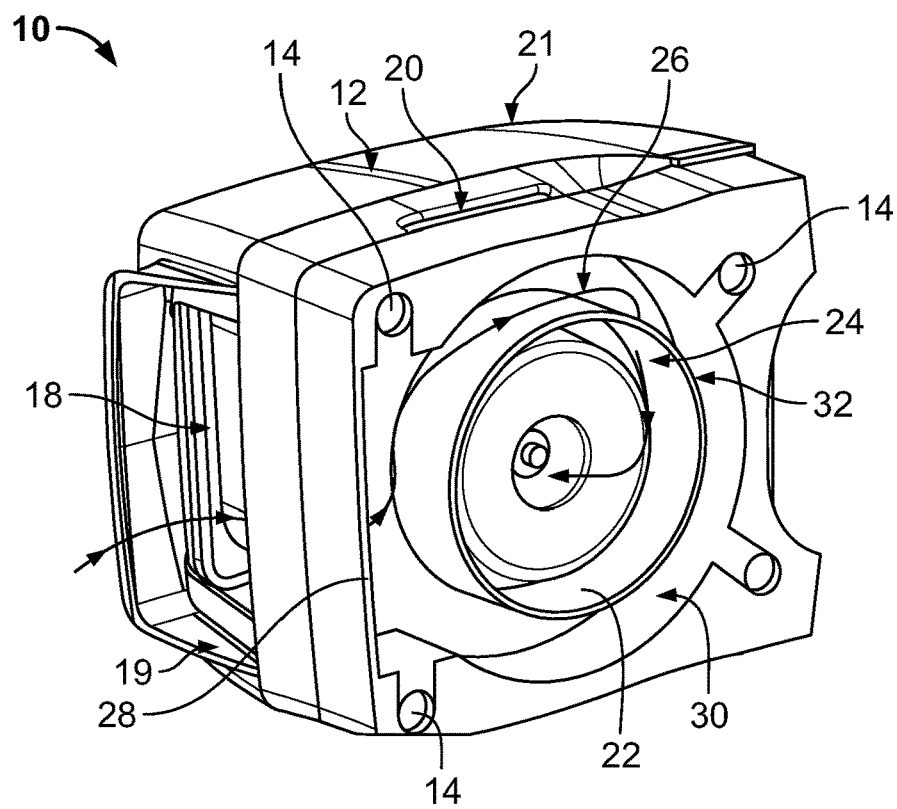
FIG. 2 is a perspective view of a blender base including a sound reducing airflow system without a base plate.

The housing 12 may include one or more feet 14, as shown in FIG. 2. The feet 14 may be any appropriate size or shape and may be located at any appropriate position about the housing 12, such as disposed about a bottom surface 15 of the housing 12. The feet 14 may engage a surface (e.g., a counter top) that supports the blender base 10 to stabilize and level the housing 12. In another aspect, the feet 14 may dampen vibrations from the housing 12. The feet 14 may be composed of any appropriate material, such as rubber or plastic.

The housing 12 may include a base plate 16, as shown in FIGS. 3 and 5-9. The base plate 16 may be any appropriate shape, size or configuration, such as rectangular, square, circular or designed to generally correspond to the shape of the housing 12. The base plate 16 may connect to a bottom surface 15 of the housing 12 to seal the air gap between the surface supporting the blender base 10 (e.g., a counter) and an interior portion of the housing 12. The base plate 16 may be positioned inside of the feet 14 to allow the feet 14 to directly contact the supporting surface while still sealing any air gap.

The housing 12 may include an air inlet port 18 to receive air into the blender base 10. The inlet port 18 may be any appropriate size or shape and may be located at any appropriate position on the housing 12. For example, the housing 12 may include a single inlet port 18 located at a back or rear side 19 of the housing 12. In an embodiment, the inlet port 18 may be centered along a rear side 19 of a four-sided housing 12, wherein references to the four sides do not include a top and bottom portion of the housing 12. In embodiments where housing 12 may comprise a different number of sides, the air inlet port 18 may be disposed generally out of sight of a user, such as on an opposite side of an interface. It is noted, however, that housing 12 may include other or additional air inlet ports. For instance, housing 12 may include one or more air inlet ports disposed on a bottom, front, or other side of the housing 12.

Figure 7:
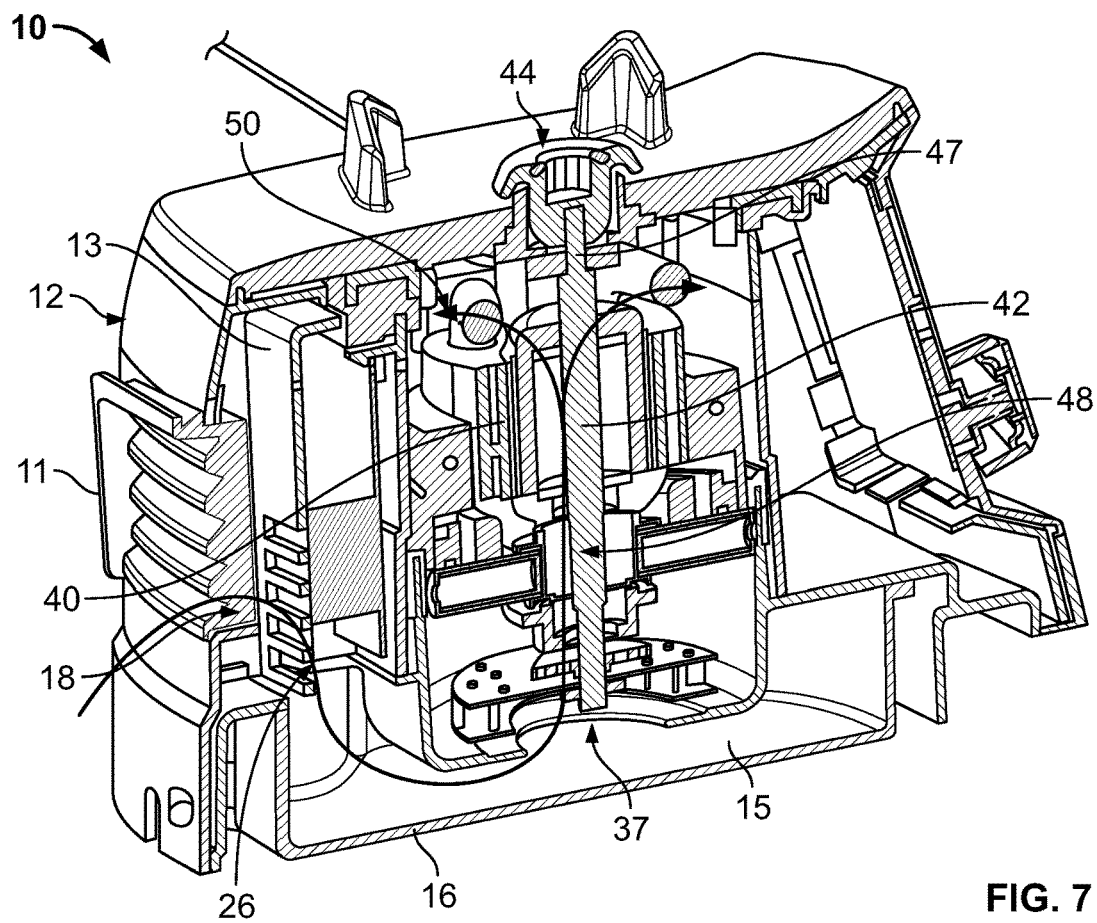
FIG. 7 is a cross-sectional perspective view of a blender base including a sound reducing airflow system.
Figure 8:
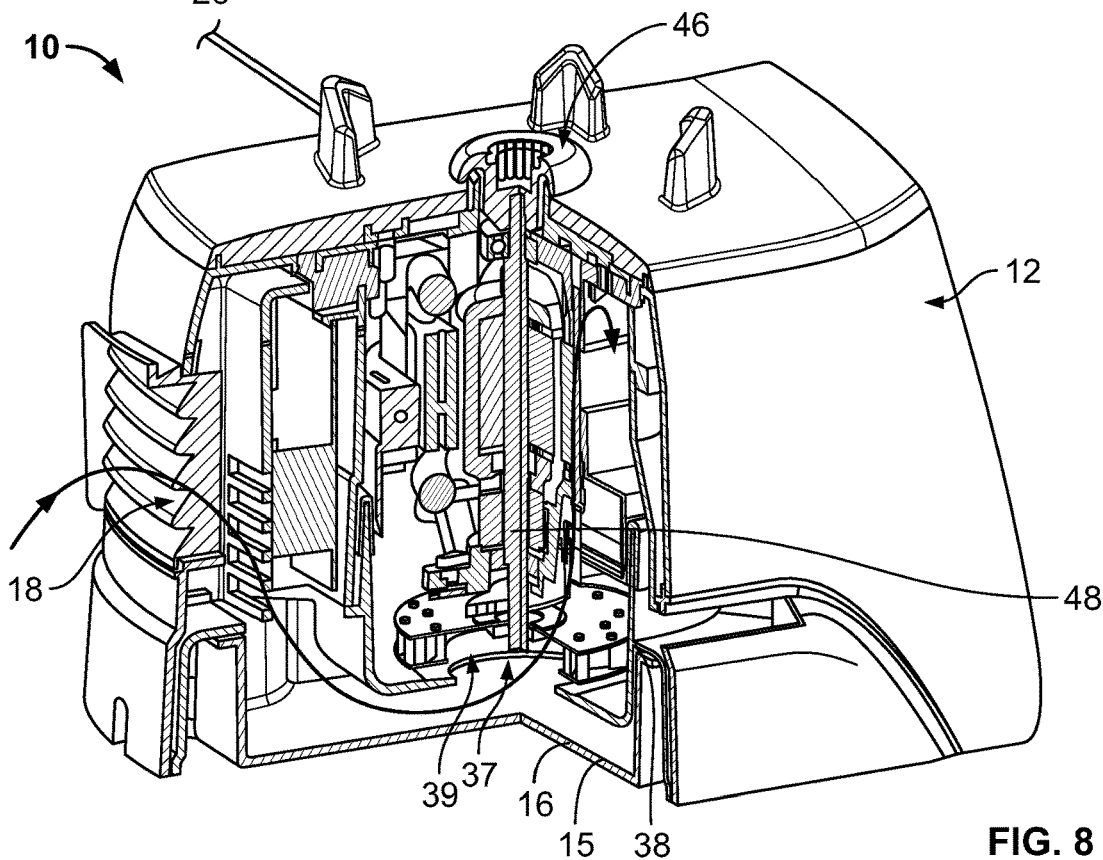
FIG. 8 is a cross-sectional perspective view of a blender base including a sound reducing airflow system.
Figure 9:
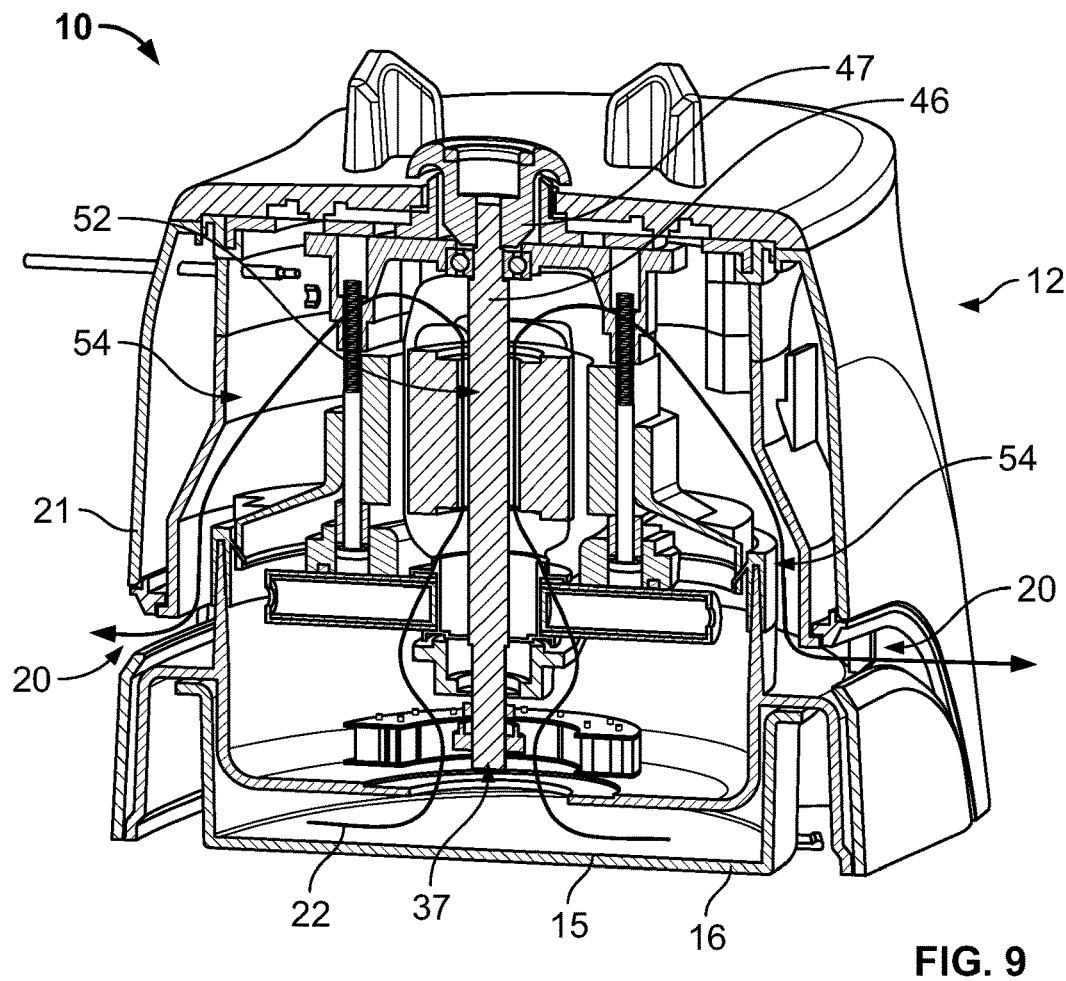
FIG. 9 is a cross-sectional perspective view of a blender base including a sound reducing airflow system.

The inlet port 18 may include one or more apertures. The aperture or apertures may be covered by a vent or grill 11 to prevent debris from entering the blender base 10, as shown in FIG. 7. In an embodiment, blender base 10 may include an internal or second grill 13. The inlet port 18 may allow ambient air to enter the blender base 10 and cool internal components. It is noted that, inlet port 18 may comprise multiple apertures disposed on multiple sides of housing 12.

The housing 12 may include an air exhaust port 20 to expel air out of the blender base 10. The exhaust port 20 may be any appropriate size or shape and may be located at any appropriate position on the housing 12. For example, the housing 12 may include one or more exhaust port(s) 20 located at a side 21 of the housing 12. In an embodiment, the exhaust port 20 may be centered along any side of the housing 12. It is noted that the exhaust port 20 may be disposed at various locations along housing 12. 12. The exhaust port 20 may include one or more apertures. The aperture or apertures may be covered by a vent or grill (not shown) to prevent debris from entering the blender base 10.

The housing 12 may include an air passageway 26 for air entering the housing 12 through the air inlet port 18. For example, air may enter a first end 28 of the air passageway 26. The passageway 26 may be defined by a lower chamber wall 30 of the housing 12 being on one side. The passageway 26 may be any appropriate size or shape. In an embodiment, the passageway 26 may extend in a generally arcuate path within the housing 12. The passageway 26 may divide and intersect at an interior point within the housing 12.

The passageway 26 may extend between the first end 28 and a second end 32. The first end 28 of the passageway 26 may receive air from the air inlet port 18. The air may travel a curved or tortuous path, and accordingly, the line of sound transmission may also bend. This may reduce sound perceivable outside of the housing. In one embodiment, as shown in FIG. 2, the air enters through the air inlet port 18 on the rear side 19 of the housing 12 and travels through the passageway 26.

Figure 3:
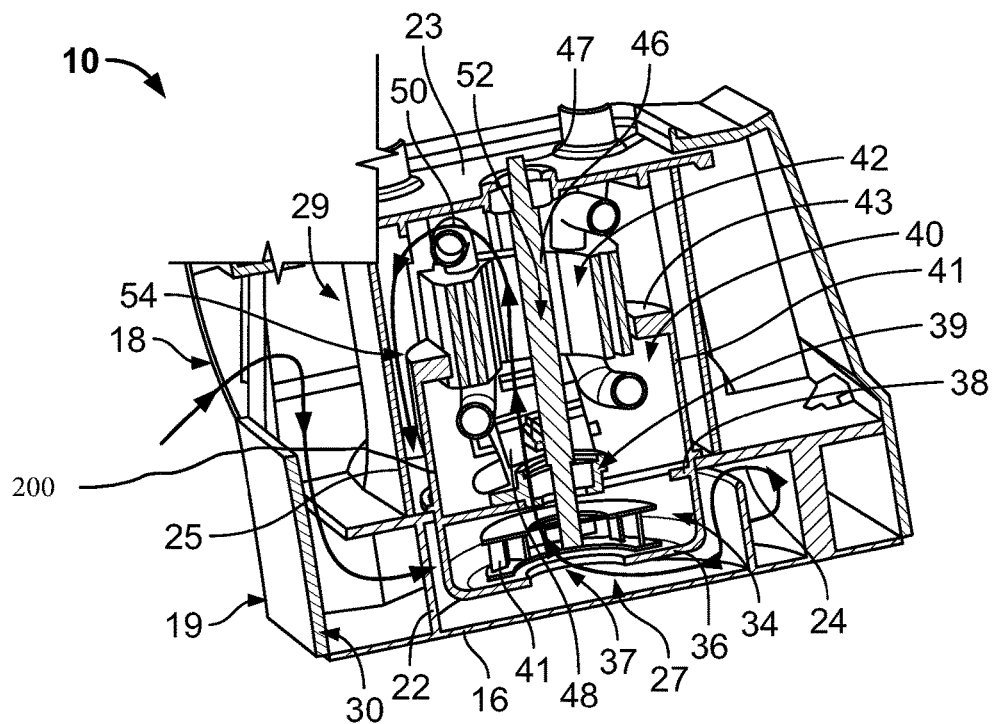
FIG. 3 is a cross-sectional perspective view of a blender base including a sound reducing airflow system.
Figure 4:
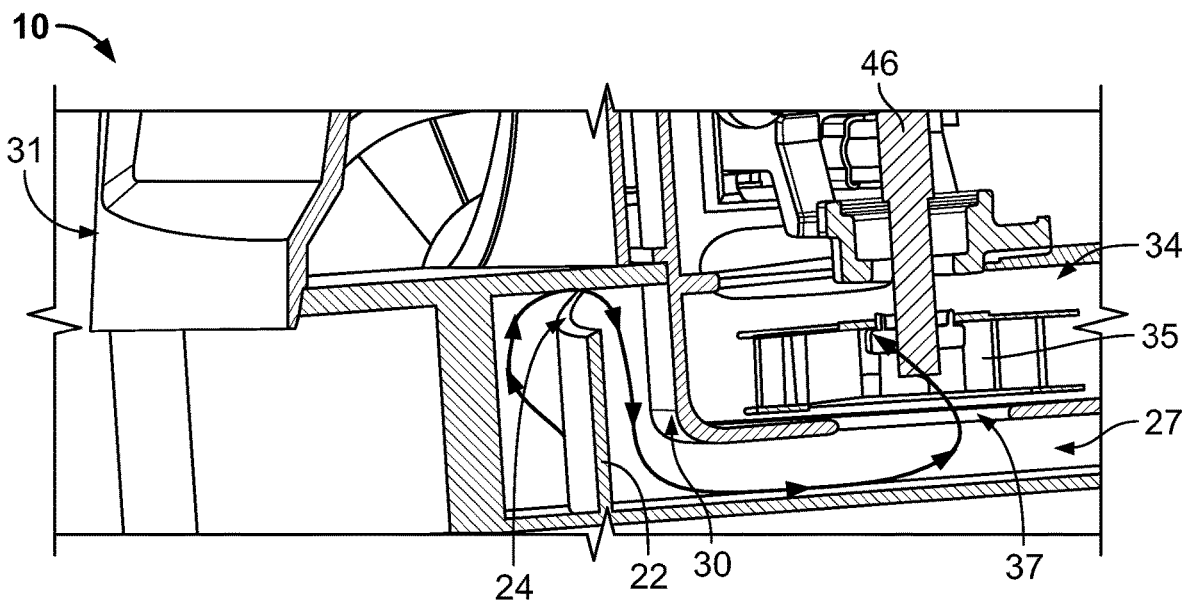
FIG. 4 is an enlarged cross-sectional view of a blender base including a sound reducing airflow system.
Figure 5:
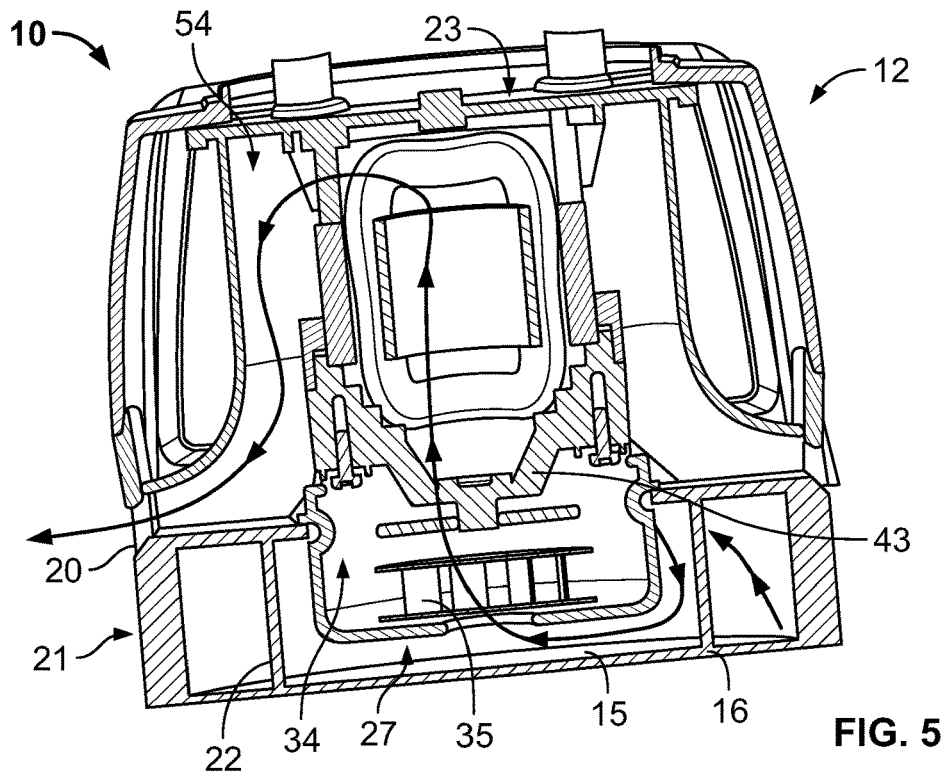
FIG. 5 is a cross-sectional perspective view of a blender base including a sound reducing airflow system.
Figure 6:
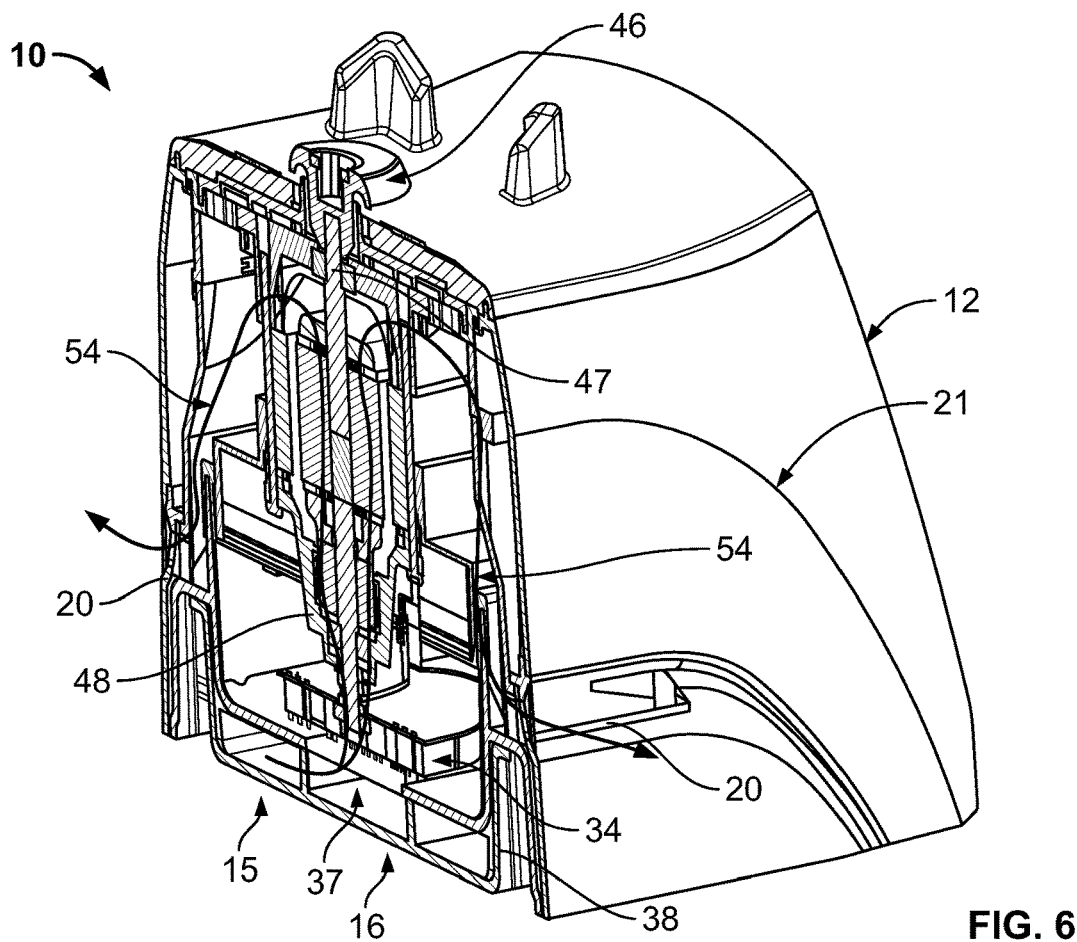
FIG. 6 is a cross-sectional perspective view of a blender base including a sound reducing airflow system.

The housing 12 may include the lower chamber 27 and the upper chamber 29, as shown in FIG. 3. The lower chamber 27 may comprise a diffuser 22 having a diffuser aperture 24, as described in more detail herein. The diffuser 22 and other components of the housing may form the curved path of the passageway 26. For instance, the upper chamber 29 may be defined on the bottom by the dividing wall 38, on the top by a top plate 23, and on the sides by upper chamber side walls 25. The lower chamber 27 may be defined on the bottom by the base plate 16 and on the top by a dividing wall 38. In an aspect, air may pass through air inlet port 18 and may circulate about the upper chamber 29. This may, for instance, allow ambient air to circulate about various operative components, such as user interfaces (not shown), circuit boards (not shown), the motor chamber 40, or the like.

The lower chamber may comprise a fan chamber 34. The fan chamber 34 may be any appropriate size or shape, such as generally cylindrical, rectangular, oval, circular, a complex shape, etc. and configured to house a fan 35. The fan chamber 34 may be located at any appropriate position on the housing 12, such as generally centered in the lower chamber 27. The fan chamber 34 may comprise a bottom wall 36 comprising a first fan opening 37 and the dividing wall 38 comprising a second fan opening 39. The bottom wall 36 may be generally straight or generally curved in shape and may create a surface around the lower perimeter of the fan chamber 34. The bottom wall 36 may be integrally formed with the housing 12 or removable from the housing 12 to provide service access to the fan chamber 34. For example, the bottom wall 36 may be connected to the dividing wall 38 by one or more mechanical fasteners (e.g., screws, bolts, latches, etc.), chemical adhesives, or by any other connecting means. It is noted, however, that the bottom wall 36 may be integrally formed with the dividing wall 38 or otherwise connected thereto.

The first fan opening 37 may be located in the bottom wall 36 to provide access between the lower chamber 27 and the fan chamber 34. The first fan opening 37 may be any appropriate size or shape, such as rounded, squared, or otherwise configured to reduce resistance of the air flow, and may be located at any appropriate position in the bottom wall 36, such as centered.

The dividing wall 38 may be generally curved, concave, convex or straight (e.g., plainer) to direct airflow along the upper perimeter of the fan chamber 34. The dividing wall 38 may be integrally formed with the housing 12. The second fan opening 39 may be located in the dividing wall 38 to provide access between the fan chamber 34 and a motor housing 40 located in the upper chamber 29 of the housing 12.

The dividing wall 38 may be configured to facilitate airflow between the motor housing 40 and the fan chamber 34. To that and various other ends, the dividing wall 38 may include a tapered surface proximate to the second fan opening 39. The tapered surface may be curved or slanted toward or away from the fan chamber 34. The tapered surface may extend up to or into the second fan opening 39.

The motor 42 may be positioned anywhere within the motor housing 40. The motor 42 may be any type of motor, such as an electric AC motor, a stepper motor, switched reluctance motor, brushless motor, shunt motor, copper-brush motor, universal motor, induction motor or the like. The motor 42 may include a shaft 46. The shaft 46 may be any appropriate size or shape, such as generally cylindrical or rod-like. The motor 42 may rotate the shaft 46 to facilitate rotation of other components of the blender base 10 (e.g., fan blades, a blade assembly, etc.). It is noted that the blender base 10 may include a different number of motors.

The motor 42 or motor housing 40 may also include an entry aperture 48 and an exit aperture 50, as shown in FIG. 3. The entry and exit apertures 48, 50 may be on opposite ends, different sides, or on any other appropriate places on the motor 42 or motor housing 40, such as on sides of sidewalls 41. The passageway between the entry aperture 48 and exit aperture 50 may pass through a motor bore 52 of the motor 42. The air enters the motor housing 40 through the entry aperture 48, travels through the motor bore 52, and exits the motor housing 40 through the exit aperture 50. The motor bore 52 comprises the primary path for which air passes through the motor housing 40.

According to at least one embodiment, a motor baffle member 200 may restrict or direct airflow so that all or substantially all air is forced through the motor bore 52. As described here and elsewhere in the specification, the motor baffle member 200 may generally frame (e.g., circumvent, surround, etc.) a portion of the motor 42. For instance, at least the motor baffle member 200 may generally seal a portion of motor 42 so as to prevent air flow exiting the motor housing 40 other than through the motor bore 52. It is noted that this may increase efficiency of temperature management within the blender base 10 when compared to other systems, such as systems have alternative paths that route air.

As described herein, the air may pass through the blender base 10 in a way so the sound bends, thereby reducing perceptible sound. In an example, the air may exit the exit aperture 50 and enter an exhaust channel 54. The distal end of the exhaust channel 54 may connect to the exhaust port 20, whereby air can exit the blender base 10 and enter the environment. In this process, the air passes in a way to eliminate the line of sound transmissions between the fan 35 and the exit aperture 50, thereby both, reducing sound, and cooling the motor 42.

The fan 35 may be connected to the shaft 46, such as at a distal end of the shaft 46. The fan 35 may be positioned within the fan chamber 34. The fan 35 may be rotated by the motor 42 to facilitate air flow through the blender base 10, thereby cooling the motor 42 and other related components. The fan may be positioned within the fan chamber 34 to abut a portion of the bottom wall 36 that may be tapered.

A shaft coupler 47 may be connected to the shaft 46, shown in FIG. 3. The shaft coupler 47 may be connected at any appropriate position along the shaft 46, such as at an end of the shaft 46 opposite the fan 35. The shaft coupler 47 may be connectable to a blade assembly of a blender container (both not shown). For example, the shaft coupler 47 may include an opening to receive or otherwise connect to the blade assembly of a blender container. The shaft coupler 47 may be driven by the shaft 46 to rotate the blade assembly of the blender container, thereby facilitating rotation of the blender blade.

The blender base 10 may include a control panel (not shown). The control panel may allow a user to selectively control the motor 42, such as turning the motor 42 on and off and selecting motor speeds. The control panel may include a display, on/off switch, speed controls, and other controls necessary to control the motor functions.

In operation, a user may turn on the blender base 10 to initiate rotation of the motor 42. The motor 42 may rotate the shaft 46, which in turn may rotate the shaft coupler 47 and the fan 35. The fan 35 may draw air into the blender base 10, such as through the inlet port 18. Air may flow through the interior of the housing 12 via the air passageway 26, around the diffuser 22, and into the lower chamber 27 via the diffuser aperture 24. The fan 35 may circulate the air out of the lower chamber 27 through the first fan opening 37 and into the fan chamber 34. The air may then exit the fan chamber 34 by way of the second fan opening 39, and the air may enter the motor housing 40. The air may cool the motor 42 and motor related components. The air may cycle through the motor 42 via entry aperture 48, through the motor bore 52, and exit via the exit aperture 50. The air may then circulate out of the housing 12 through the exhaust channel 54 and ultimately out the exhaust port 20. It is note that one or more of these apertures may be small, controlled openings to provide minimal disturbance to the inner workings of the blender, e.g., the fan 35, the motor 42, etc. The air is controlled and the apertures and pathways provide a tortuous path that encourages bending of the sound line, which thereby decreases the noise caused by air circulation. As a result of this, the perceptible sound levels from airflow noise can be reduced by, for example, at least 10 dB as measured outside of the blender base 10.

FIGS. 6-9 illustrate blender base 10 where the fan chamber 34 may act as a diffuser. For instance, FIGS. 6-9 illustrate blender base 10 without a separate diffuser (e.g., diffuser 22 of FIGS. 1-5). As shown in FIG. 7, for example, air passageway 26 enters the blender base through air inlet port 18, which may include grill 11. The air passageway 25 may continue through the second grill 13, and then through fan opening 37. Fan chamber 34 extends downwards from the motor housing 40 so that air inlet port 18 may be generally higher or above the first fan opening 37. Moreover, the air passageway 26 bends around the fan chamber 34, which may be curved or tapered.

Figure 10:
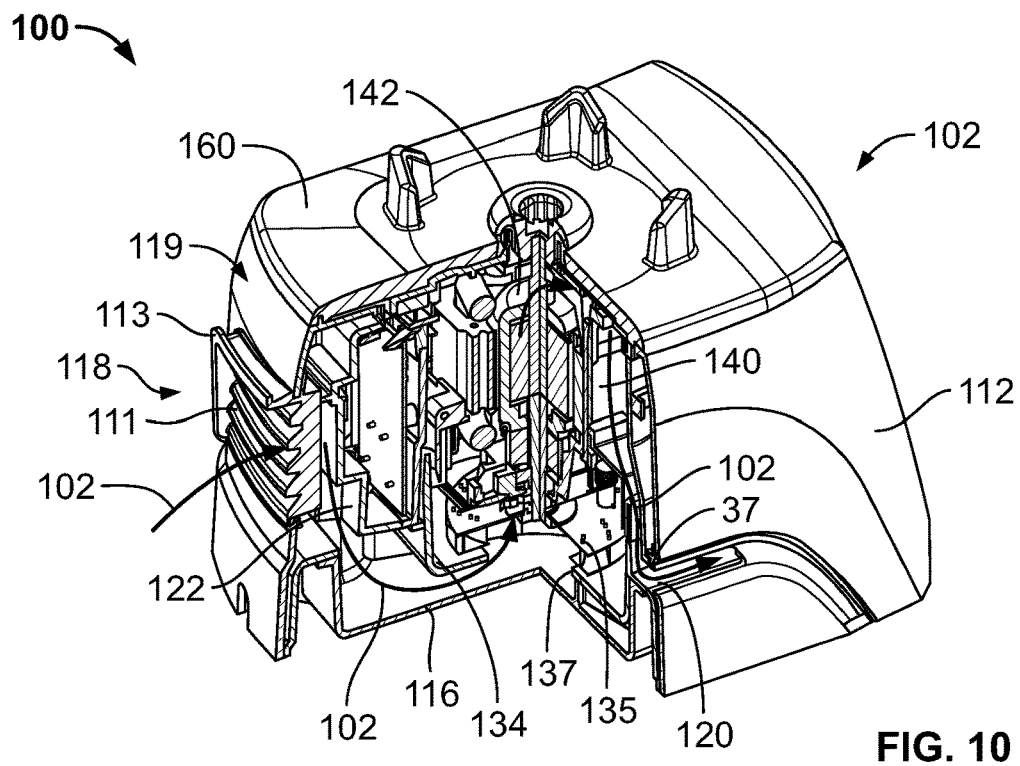
FIG. 10 is a partial, cross-sectional perspective view of a blender base including a sound reducing airflow system.
Figure 11:
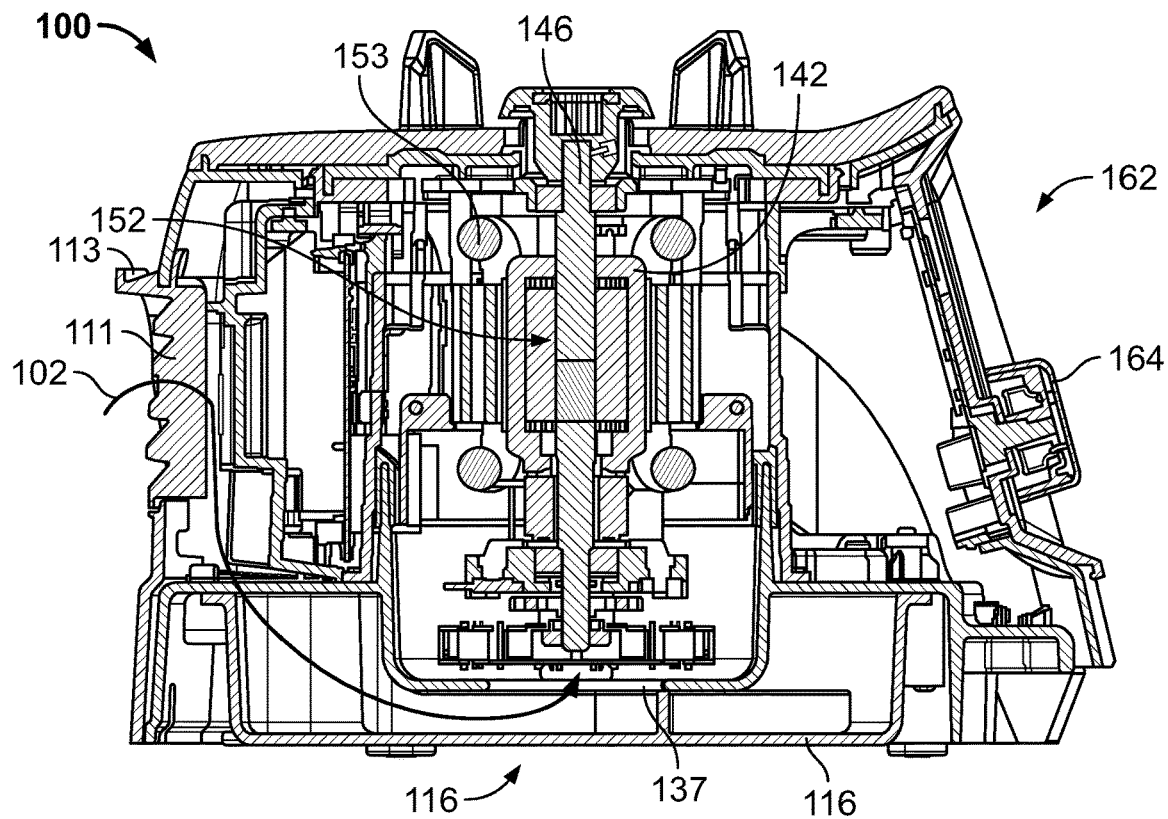
FIG. 11 is a side, cross-sectional view of a blender base including a sound reducing airflow system.
Figure 12:
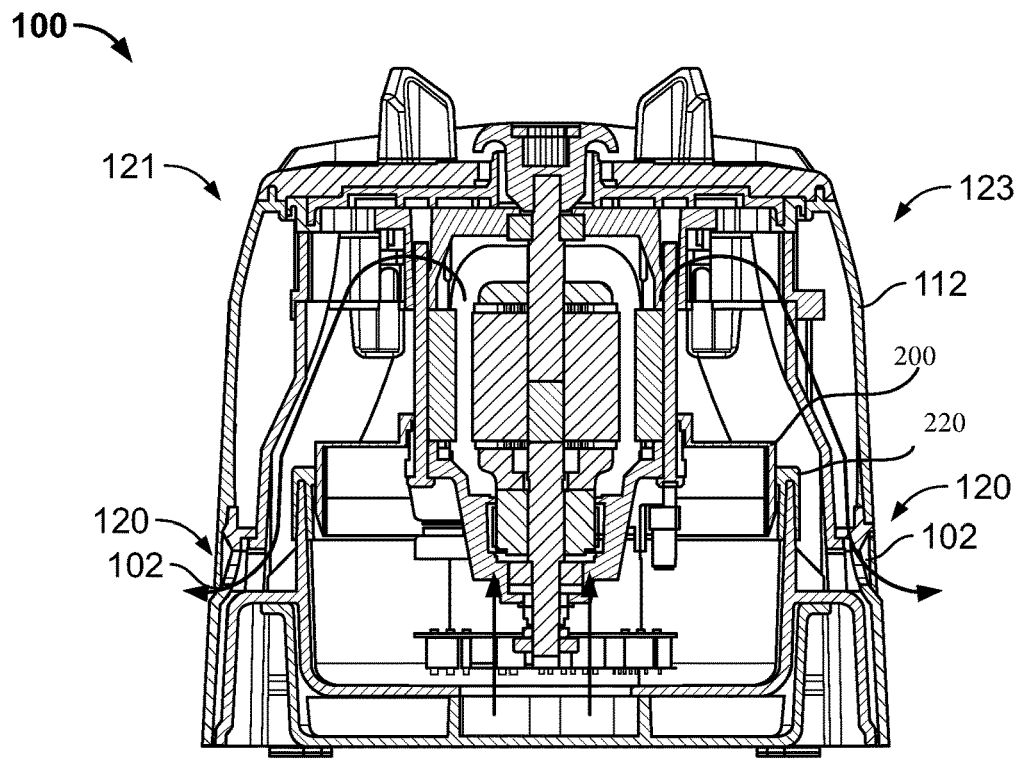
FIG. 12 is a back cross-sectional view of a blender base including a sound reducing airflow system.
Figure 13:
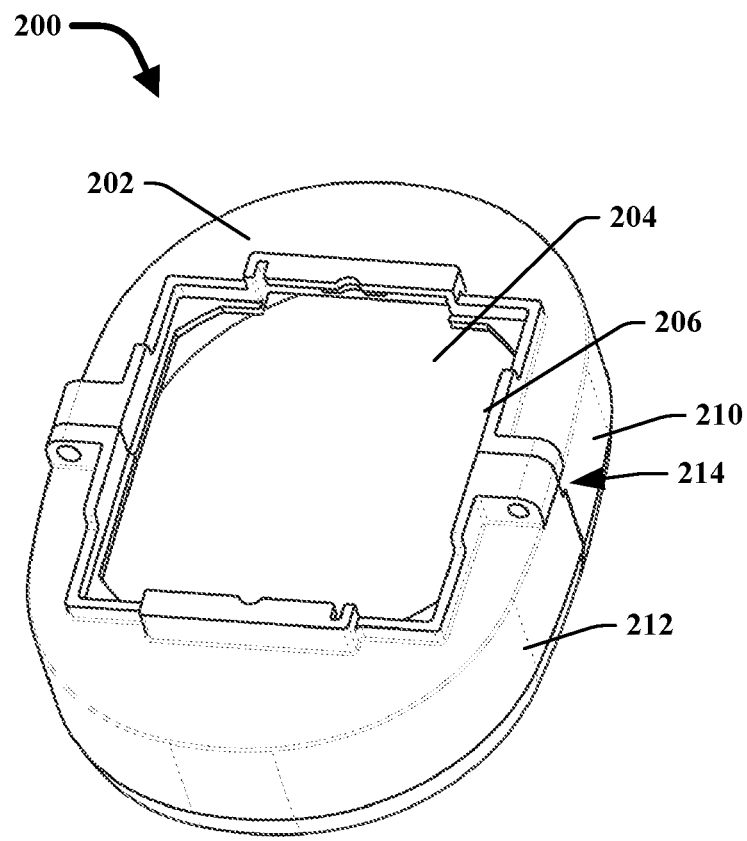
FIG. 13, is a perspective view of a motor baffle member for a blender base.

Turning now to FIGS. 10-12, there is a blender system 100 that directs airflow to control heat dissipation in accordance with various disclosed aspects. Blender system 100 may include blender base 162. The blender base 162 may include a housing 112 that houses a motor 142 and other operative components of the blender base 162. In another aspect, the housing 112 may comprise a pedestal 160 that operatively receives and/or supports a blender container (not shown). It is noted that blender system 100 may include all or some of the components and/or functionality as described with reference to blender base 10 and various other disclosed embodiments. Moreover, like-named components may comprise similar features unless context suggests otherwise or warrants a particular distinction among such terms.

Housing 112 may comprise a shell or body that supports and/or houses various components. The housing 112 may comprise plastic, metal, or other appropriate materials. Housing 112 may include an inlet aperture or port 118. The inlet port 118 may comprise various sizes or shapes, and may be disposed at appropriate locations about the housing 112. For example, the inlet port 118 may be disposed at a rear side 119. The rear side 119 may be a side that is generally not directed towards a user. As shown in FIG. 11, the rear side 119 may be generally opposite a front side 162 that may comprise a user interface 164. As such, the inlet port 118 may be generally directed away from a user. The inlet port 118 may be at least partially surrounded or protected by a hood 113 that protrudes from the housing 112 to prevent spilled foodstuff from entering or clogging a grill 111. It is noted, however, that the inlet port 118 may be disposed at various other locations, such as at a bottom side 166.

A fan 135 may be driven by an axle or shaft 146. It is noted that the shaft may be driven by a motor 142 that may drive a blade assembly (not shown), and/or by a separate motor. The fan 135 may draw or force airflow 102 to pass through the housing 112. In an example, airflow 102 may be pulled from an external environment through the inlet port 111. A diffuser 122 may be disposed proximal the inlet port 111. The diffuser 122 may comprise a wall that may comprise steps, a tapered surface, or the like. The diffuser 122 may direct airflow 102 between a bottom plate 116 and the diffuser 122. The airflow 102 may then be pulled into a fan chamber 134 through a fan inlet 137.

The airflow 102 may be force through a fan inlet 137 and directed through a motor bore 152 to alter (e.g., reduce, control, etc.) the temperature of a motor 142 or other operative components of the blender system 100. For example, cooler air from an external environment may force warmer air from proximal the motor 142, to one or more exhaust ports 120. The airflow 102 may force air through a passageway defined by a motor housing 140 and the housing 112.

The motor bore 152 may comprise the primary path for airflow 102. In an aspect, the blender base 152 may be structured so that airflow 102 passing proximal the motor 142 is prevented from traveling around the motor bore 152. In an aspect, the blender base 152 may not contain any alternate pathways that direct airflow 102 from circumventing the motor bore 152.

As shown in the figures, a motor baffle member 200 may generally comprise a body 202 of an appropriate shape and configuration. The body 202 may comprise an aperture 204 having a perimeter 206. The perimeter 206 may be positioned about a portion of motor 142, including motor coils 153. It is noted that the body 202 and the perimeter 206 may be shaped to generally restrict airflow 102 such that it is forced through the motor bore 152. According to embodiments, all or generally all airflow 102 may be forced through the motor bore 152. As described herein, the fan 135 may force the airflow 102 through the motor bore 152 by pushing or puling the airflow 102. As such, while embodiments may describe airflow 102 being pushed or pulled in a particular direction, other embodiments may operatively force airflow in an opposite direction.

It is noted that the body 202 may be monolithically formed or formed of one or more pieces and then attached together to form the body 202. For instance, body 202 may comprise a first portion 210 and a second portion 212. According to an example, the first portion 210 and the second portion 212 may be positioned about the motor 142 and may then be attached at a joint 214. This may allow for a closely fitting engagement between the motor baffle member 200 and the motor 142.

In another aspect, a gasket 220 may be operatively positioned between motor baffle member 200 and fan chamber 134. The gasket 220 may dampen or prevent transfer of vibrations between the motor baffle member 200 to the fan chamber 134, which may reduce the overall noise occurring during operation of the blending system. In another aspect, the gasket 220 may generally seal the fan chamber 134 from other portions of the housing 112 such that airflow 102 is forced through the aperture 204 of the motor baffle member 200.

In embodiments, the fan 135 may force airflow 102 through the aperture 204 and motor bore 152 so that it exits the motor bore 152 proximal coils 153. This may, for instance, force air away from the coils 153 to dissipate heat therefrom. It is noted, however, that embodiments may utilize other types of motors that may not comprise coils 153.

Further, in some embodiments the flow of air may be opposite of what is described above. In these embodiments, the baffle member 200 may allow all or generally all of the airflow 102 may be forced from the motor bore 152 out the aperture 204.

While the exhaust ports 120 are illustrated on sides 121 and 123 of the housing 112, it is noted that system 100 may include other or different exhaust ports. For instance, the system may include a different number of exhaust ports and/or exhaust ports located in various other positions. As shown, the exhaust ports 120 may be positioned such that foodstuff that may spill from a container is not likely to enter the exhaust ports 120.

It is noted that the various apertures may be formed or disposed orthogonally or at an angle other than ninety degrees with respect to the various surfaces at which they are located. In another aspect, the various apertures may comprise rounded edges, squared edges, angled edges or the like.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender base, comprising:
   a housing comprising an air inlet aperture;
   a motor disposed within a motor bore in the housing;
   a diffuser disposed in the housing and comprising a diffuser aperture operatively in fluid communication with the air inlet aperture;
   a fan operatively forcing air to travel in a path from the air inlet aperture, about the diffuser, and then through the diffuser aperture; and
   a motor baffle member positioned about at least a portion of the motor, wherein the motor baffle member restricts airflow, forcing air through the motor bore,
   wherein the diffuser aperture is out of a line of sight of the air inlet aperture and the air inlet aperture is positioned above the fan.

2. The blender base of claim 1, wherein the diffuser comprises a curved wall.

3. The blender base of claim 1, wherein the diffuser comprises a wall comprising at least one corner.

4. The blender base of claim 1, wherein the housing further comprises an exhaust aperture.

5. The blender base of claim 4, wherein the exhaust aperture is out of a line of sight of the fan.

6. The blender base of claim 1, wherein the motor baffle member comprises a body comprising an aperture having a perimeter, wherein the perimeter is positioned about the at least a portion of the motor.

7. The blender base of claim 6, wherein the body is attached to the housing at a joint.

8. The blender base of claim 1, further comprising a fan chamber disposed in the housing, wherein the fan is disposed within the fan chamber.

9. The blender base of claim 1, wherein the motor operatively drives the fan.

10. A blender base, comprising:
    a housing;
    a motor disposed within the housing and comprising a motor bore;
    a motor baffle member disposed about at least a portion of the motor; and
    a fan disposed in an air passageway within the housing, wherein the motor baffle member operatively directs all air from the fan through only the motor bore and out of the housing such that the air from the fan is restricted from circulating about the housing.

11. The blender base of claim 10, wherein the motor baffle member comprises a body comprising an aperture having a perimeter, wherein the perimeter is positioned about at least a portion of the motor.

12. The blender base of claim 11, wherein the body is attached to the housing at a joint.

13. The blender base of claim 10, wherein the housing further comprises a fan chamber; and
    wherein a gasket is positioned between the motor baffle member and the fan.

14. The blender base of claim 13, wherein the gasket dampens vibrations between the motor baffle member and the fan chamber.

15. The blender base of claim 13, wherein the motor baffle member comprises a body having an aperture, the aperture operatively in a closely fitting engagement with at least a portion of the motor.

16. The blender base of claim 13, wherein the gasket generally seals the fan chamber from other portions of the housing.

17. The blender base of claim 10, wherein the housing further comprises a user interface disposed on a first side of the housing.

18. A blender system, comprising:
    a blender base comprising a housing having an air inlet port and defining an air passageway;
    a motor bore positioned within the housing and a motor disposed within the motor bore;
    a motor baffle member operatively restricting the air passageway from circumventing the motor bore;
    a fan disposed in the air passageway; and
    a diffuser disposed between the air inlet port and the fan, wherein the fan operatively pulls air through the diffuser and pushes the air through the motor bore.

19. The blender system of claim 18, wherein the diffuser defines an aperture and is disposed in the housing,
    the aperture being disposed generally opposed to the air inlet port.

20. The blender system of claim 18, further comprising a fan chamber housing the fan and a gasket, wherein the gasket dampens vibrations between the motor baffle member and the fan chamber.

* * * * *